US008640055B1

(12) United States Patent  (10) Patent No.: US 8,640,055 B1
Dunning et al.  (45) Date of Patent: Jan. 28, 2014

(54) CONDENSING HIERARCHIES IN USER INTERFACES

(75) Inventors: John Dunning, Belmont, CA (US); Murat N. Konar, Emeryville, CA (US)

(73) Assignee: Pixar, Emeryville, CA (US)

( * ) Notice: Subject to any disclaimer, the term of this patent is extended or adjusted under 35 U.S.C. 154(b) by 465 days.

(21) Appl. No.: 12/907,964

(22) Filed: Oct. 19, 2010
(Under 37 CFR 1.47)

(51) Int. Cl.
*G06F 3/048* (2013.01)

(52) U.S. Cl.
USPC ............................................. 715/853

(58) Field of Classification Search
USPC ............................................. 715/853
See application file for complete search history.

(56) References Cited

U.S. PATENT DOCUMENTS

| | | | | |
|---|---|---|---|---|
| 5,206,950 | A * | 4/1993 | Geary et al. | 717/109 |
| 5,333,254 | A * | 7/1994 | Robertson | 715/853 |
| 5,812,135 | A * | 9/1998 | Kotchey | 715/853 |
| 5,895,474 | A * | 4/1999 | Maarek et al. | 715/854 |
| 5,923,328 | A * | 7/1999 | Griesmer | 715/854 |
| 6,271,846 | B1 * | 8/2001 | Martinez et al. | 715/854 |
| 6,380,957 | B1 * | 4/2002 | Banning | 715/828 |
| 6,636,250 | B1 * | 10/2003 | Gasser | 715/853 |
| 7,054,878 | B2 * | 5/2006 | Gottsman et al. | 345/629 |
| 7,242,413 | B2 * | 7/2007 | Chu et al. | 715/851 |
| 7,337,412 | B2 * | 2/2008 | Guido et al. | 715/853 |
| 7,363,593 | B1 * | 4/2008 | Loyens et al. | 715/853 |
| 7,389,296 | B2 * | 6/2008 | Chari et al. | 707/999.1 |
| 7,503,013 | B2 * | 3/2009 | Donoghue et al. | 715/810 |
| 7,640,517 | B2 * | 12/2009 | Moehrle | 715/855 |
| 7,644,374 | B2 * | 1/2010 | Wong et al. | 715/853 |
| 7,712,042 | B2 * | 5/2010 | Hernandez-Sherrington et al. | 715/781 |
| 8,381,134 | B2 * | 2/2013 | Weise et al. | 715/853 |
| 2003/0122873 | A1 * | 7/2003 | Dieberger et al. | 345/764 |
| 2004/0075693 | A1 * | 4/2004 | Moyer et al. | 345/810 |
| 2004/0205536 | A1 * | 10/2004 | Newman et al. | 715/509 |
| 2005/0076312 | A1 * | 4/2005 | Gardner et al. | 715/853 |
| 2005/0131945 | A1 * | 6/2005 | Muller et al. | 707/104.1 |
| 2005/0132304 | A1 * | 6/2005 | Guido et al. | 715/853 |
| 2005/0138483 | A1 * | 6/2005 | Hatonen et al. | 714/45 |
| 2006/0155746 | A1 * | 7/2006 | Abrams et al. | 707/102 |
| 2007/0198930 | A1 * | 8/2007 | Chu et al. | 715/713 |
| 2008/0016474 | A1 * | 1/2008 | Guido et al. | 715/854 |
| 2008/0028337 | A1 * | 1/2008 | Michaud et al. | 715/810 |
| 2008/0040382 | A1 * | 2/2008 | Morris et al. | 707/102 |
| 2009/0113350 | A1 * | 4/2009 | Hibino et al. | 715/853 |
| 2009/0217175 | A1 * | 8/2009 | Bechtel et al. | 715/751 |
| 2011/0145765 | A1 * | 6/2011 | Yu et al. | 715/835 |
| 2011/0276906 | A1 * | 11/2011 | Lipstein et al. | 715/760 |
| 2013/0061182 | A1 * | 3/2013 | Weise et al. | 715/853 |

* cited by examiner

*Primary Examiner* — Stephen Hong
*Assistant Examiner* — Joseph R Burwell
(74) *Attorney, Agent, or Firm* — Patterson & Sheridan, LLP (57) ABSTRACT

Items in a hierarchy may be displayed in an outline view, where each item at a hierarchy level is presented in a separate line, or as condensed hierarchy lines. A condensed hierarchy line displays two or more related items in a single line. Condensed hierarchy lines present the context of items in a hierarchy in reduced display area as compared with outline views. Users may add or remove items from condensed hierarchy lines using any type of input. Each portion of a condensed hierarchy line represents a different item at a different level of the hierarchy. Items in the condensed hierarchy line may include active user interface elements. Users or applications may define multiple condensed hierarchy lines as needed from arbitrary groups of items in adjacent hierarchy levels. Multiple condensed hierarchy lines can be used to show context for sibling relationships between items.

24 Claims, 6 Drawing Sheets

```
              main_cam
              Body_sbdv
110d        ▶ Face      105a
            ▶ Legs      105b
            ▶ Arms      105c
110e        ▶ Body      105d
            ▼ deform    105e
              HeadIK
110a        ▼ Body           105f
              ▶ Body_PosedWigets
              ▶ postDef
              ▶ Hips
110b          ▼ Torso        105g
                ▼ Torso_rot      105n
                  ▼ Torso2_rot       105o
                    ▼ Chest_rot       105p
                      ▼ Chest2_rot
                        ▼ UpChest_rot
                          ▼ RShldr
                            ▼ Shldr
                              ▼ Arm
                                ▼ RElbow
110c                            ▼ Hand       105h
                                  ▼ ThumbRoot1    105i
                                    ▼ Thumb
                                      ▼ ThumbMid
                                        ThumbTip
                                  ▼ IndexRoot1    105j
                                    ▼ Index
                                      ▼ IndexMid
                                        IndexTip
                                  ▼ MiddleRoot1   105k
                                    ▼ Middle
                                      ▼ MiddleMid
                                        MiddleTip
                                  ▼ RingRoot1     105l
                                    ▼ Ring
                                      ▼ RingMid
                                        RingTip
                                  ▼ PinkyRoot1    105m
                                    ▼ Pinky
                                      ▼ PinkyMid
                                        PinkyTip
                          ▼ LShldr
                            ▼ Shldr
                              ▼ Arm
                                ▼ LElbow
                                  ▼ Hand
                                    ▼ ThumbRoot1
                                      ▼ Thumb
                                        ▼ ThumbMid
                                          ThumbTip
                                    ▼ IndexRoot1
                                      ▼ Index
                                        ▼ IndexMid
                                          IndexTip
                                    ▼ MiddleRoot1
                                      ▼ Middle
                                        ▼ MiddleMid
```

```
main_cam
Body_sbdv
▶ Face    105a
▶ Legs    105b
▶ Arms    105c
▶ Body    105d
▼ deform 105e
    HeadIK
    ▼ Body    105f
       ▶ Body_PosedWigets
       ▶ postDef
       ▶ Hips
       ▼ Torso    105g
          ▼ Torso_rot 105n
             ▼ Torso2_rot ▼ Chest_rot   205
                ▼ Chest2_rot
105o               ▼ UpChest_rot          105p
                      ▼ RShldr
                        ▼ Shldr
                          ▼ Arm
                            ▼ RElbow
                              ▼ Hand    105h
                                ▼ ThumbRoot1  105i
                                  ▼ Thumb
                                    ▼ ThumbMid
                                       ThumbTip
                                ▼ IndexRoot1  105j
                                  ▼ Index
                                    ▼ IndexMid
                                       IndexTip
                                ▼ MiddleRoot1  105k
                                  ▼ Middle
                                    ▼ MiddleMid
                                       MiddleTip
                                ▼ RingRoot1   105l
                                  ▼ Ring
                                    ▼ RingMid
                                       RingTip
                                ▼ PinkyRoot1  105m
                                  ▼ Pinky
                                    ▼ PinkyMid
                                       PinkyTip
                      ▼ LShldr
                        ▼ Shldr
                          ▼ Arm
                            ▼ LElbow
                              ▼ Hand
                                ▼ ThumbRoot1
                                  ▼ Thumb
                                    ▼ ThumbMid
                                       ThumbTip
                                ▼ IndexRoot1
                                  ▼ Index
                                    ▼ IndexMid                200
                                       IndexTip
                                ▼ MiddleRoot1
                                  ▼ Middle
                                    ▼ MiddleMid
```

FIG. 2

```
main_cam
Body_sbdy
► Face    105a
► Legs    105b
► Arms    105c
► Body    105d
▼ deform  105e    105g   105n   105o   105p   105q   105r
   HeadIK
305   ▼ Body ► Torso ► Torso_rot ► Torso2_rot ► Chest_rot ► Chest2_rot ► UpChest_rot ► RShldr ► Shldr ► Arm ▼ RElbow
 105f   ▼ Hand  105h
         ▼ ThumbRoot1  105i                                          105s   105t   105u   105v
            ▼ Thumb
               ▼ ThumbMid
                  ThumbTip
         ▼ IndexRoot1   105j
            ▼ Index
               ▼ IndexMid
                  IndexTip
         ▼ MiddleRoot1  105k
            ▼ Middle
               ▼ MiddleMid
                  MiddleTip
         ▼ RingRoot1    105l
            ▼ Ring
               ▼ RingMid
                  RingTip
         ▼ PinkyRoot1   105m
            ▼ Pinky
               ▼ PinkyMid
                  PinkyTip
```

```
      main_cam
        Body_sbdy
          ▸ Face    105a
          ▸ Legs    105b
          ▸ Arms    105c
          ▸ Body    105d
          ▾ deform  105e
            HeadIK
            ▾ Body
105f        ▸ Body_PosedWigets
              ▸ postDef     105g    105n    105o    105p    105q              105r
405           ▸ Hips
              ▾ Torso ▸ Torso_rot ▸ Torso2_rot ▸ Chest_rot ▸ Chest2_rot ▾ UpChest_rot
410             ▾ RShldr ▸ Shldr ▸ Arm ▸ RElbow ▾ Hand ─── 105h
                  105i   ▾ ThumbRoot1
                           ▾ Thumb
                             ▾ ThumbMid    105s    105t    105u    105v
                               ThumbTip
                  105j   ▾ IndexRoot1
                           ▾ Index
415                        ▾ IndexMid
                             IndexTip
                  105k   ▾ MiddleRoot1
                           ▾ Middle
                             ▾ MiddleMid
                               MiddleTip
                  105l   ▾ RingRoot1
                           ▾ Ring
                             ▾ RingMid
                               RingTip
                  105m  ▾ PinkyRoot1
                           ▾ Pinky
                             ▾ PinkyMid
                               PinkyTip
                ▾ LShldr  105w
                  ▾ Shldr
                    ▾ Arm
                      ▾ LElbow
                        ▾ Hand
                          ▾ ThumbRoot1
                            ▾ Thumb
                              ▾ ThumbMid
                                ThumbTip
                          ▾ IndexRoot1
                            ▾ Index
                              ▾ IndexMid
                                IndexTip
                          ▾ MiddleRoot1
                            ▾ Middle
                              ▾ MiddleMid
                                MiddleTip
                          ▾ RingRoot1
                            ▾ Ring
                              ▾ RingMid                                    400
                                RingTip
                          ▾ PinkyRoot1
                            ▾ Pinky
                              ▾ PinkyMid
```

FIG. 4

```
       main_cam
       Body_sbdv
     ▶ Face    105a
     ▶ Legs    105b
     ▶ Arms    105c
     ▶ Body    105d
     ▼ deform  105e
       HeadIK
     ▼ Body
105f ▶ Body_PosedWigets
     ▶ postDef  105g  105n  105o  105p  105q        105r
     ▶ Hips
405  ▼ Torso ▶ Torso_rot ▶ Torso2_rot ▶ Chest_rot ▶ Chest2_rot ▼ UpChest_rot
410       ▼ RShldr ▶ Shldr ▶ Arm ▶ RElbow ▼ Hand  105h
       105i  ▼ ThumbRoot1
             ▼ Thumb
               ▼ ThumbMid   105s   105t   105u   105v
                 ThumbTip
       105j  ▼ IndexRoot1
             ▼ Index
               ▼ IndexMid
                 IndexTip
       105k  ▼ MiddleRoot1
             ▼ Middle
               ▼ MiddleMid
                 MiddleTip
       105l  ▼ RingRoot1
             ▼ Ring
               ▼ RingMid
                 RingTip
       105m  ▼ PinkyRoot1
             ▼ Pinky
               ▼ PinkyMid
                 PinkyTip
505       ▼ LShldr ▶ Shldr ▶ Arm ▶ LElbow ▼ Hand
       105bb ▼ ThumbRoot1
             ▼ Thumb        105w   105x   105y   105z   105aa
               ▼ ThumbMid
                 ThumbTip
             ▼ IndexRoot1
             ▼ Index
               ▼ IndexMid
                 IndexTip
             ▼ MiddleRoot1
             ▼ Middle
               ▼ MiddleMid
                 MiddleTip
             ▼ RingRoot1
             ▼ Ring
               ▼ RingMid
                 RingTip                           500
             ▼ PinkyRoot1
             ▼ Pinky
               ▼ PinkyMid
                 PinkyTip
```

CONDENSING HIERARCHIES IN USER INTERFACES

CROSS-REFERENCE TO RELATED APPLICATIONS

This application is related to U.S. patent application Ser. No. 12/116,899, filed May 7, 2008 and issued on Jan. 17, 2012 as U.S. Pat. No. 8,099,682, entitled "Proxies for Viewing Hierarchical Data," which is incorporated by reference herein for all purposes.

BACKGROUND

The present invention relates to the field of user interfaces for computer programs and operating systems. Many computer programs and operating systems display items in hierarchical views. In a hierarchical view, items may have ancestor or descendant items. Typically, hierarchical views of items attempt to show the relationships between items and their ancestor and descendant items.

Typical user interfaces have difficulty in presenting clear hierarchical views for large number of items or deep hierarchies. For example, one common type of hierarchical view presents items in an outline format, with descendant items listed below and indented from their ancestor item. However, if an item is part of a deep hierarchy and thus has a large number of ancestor items, there may not be sufficient space within a window or on the display to show all of the ancestor items. As a result, a user may have to vertically scroll the hierarchical view to view some of the ancestor items of a descendant item. As the hierarchical view is scrolled, one or more levels of ancestor items, representing the previous levels of the hierarchy, may scroll off-screen. When this occurs, the typical hierarchical view does not provide any indication of the currently displayed items' location in the hierarchy of items. As a result, the view provided by the user interface does not provide the complete context of these descendant items' location in the hierarchy.

Therefore, there is an unmet need for a user interface that allows users to easily view the ancestors of items in deep hierarchies regardless of the number of items in a display or the depth of the hierarchy.

BRIEF SUMMARY

An embodiment of the invention displays a hierarchical view of items. Items may be ancestors or descendants of one or more other items. Items may be displayed in an outline view, in which each item at a hierarchy level is presented in a separate line or combined into a condensed hierarchy line, in which multiple lineally related items in a hierarchy are presented in the same line.

In an embodiment, a condensed hierarchy line displays two or more lineally related items, which are items that are direct ancestors or descendants of each other, in a single line or as a single unit. By displaying items representing multiple levels of a hierarchy as a condensed hierarchy line, an embodiment of the invention makes it easy for users to view the hierarchical context of items. Users may select and condense or combine lines of items using any type of input, including keyboard input, mouse input, touch screen or gesture input, voice input, and/or any combination thereof. Additionally, users may selectively separate two or more items previously combined in a condensed hierarchy line into separate lines.

In an embodiment, items in the condensed hierarchy line are represented by a different portion of the condensed hierarchy line. Each portion of the condensed hierarchy line represents a different item at a different level of the hierarchy. Items in the condensed hierarchy line may include active user interface elements for interacting with items and/or adding, removing, or hiding items in the condensed hierarchy line. Active user interface elements in condensed hierarchy lines may have the same behavior or different behavior than corresponding elements outside of the condensed hierarchy line.

In an embodiment, users or applications may define multiple condensed hierarchy lines as needed from any arbitrary groups of items in adjacent hierarchy levels. Multiple condensed hierarchy lines may be used to show the context of multiple items in deep hierarchies in the same display area. Multiple condensed hierarchy lines can be used to show context for sibling relationships between items. Sibling relationships can be further indicated with visual indicators between condensed hierarchy lines and/or items outside condensed hierarchy lines.

BRIEF SUMMARY OF THE DRAWINGS

The invention will be described with reference to the drawings, in which.

In the drawings, identical reference numbers indicate identical components.

DETAILED DESCRIPTION

Figure 1:
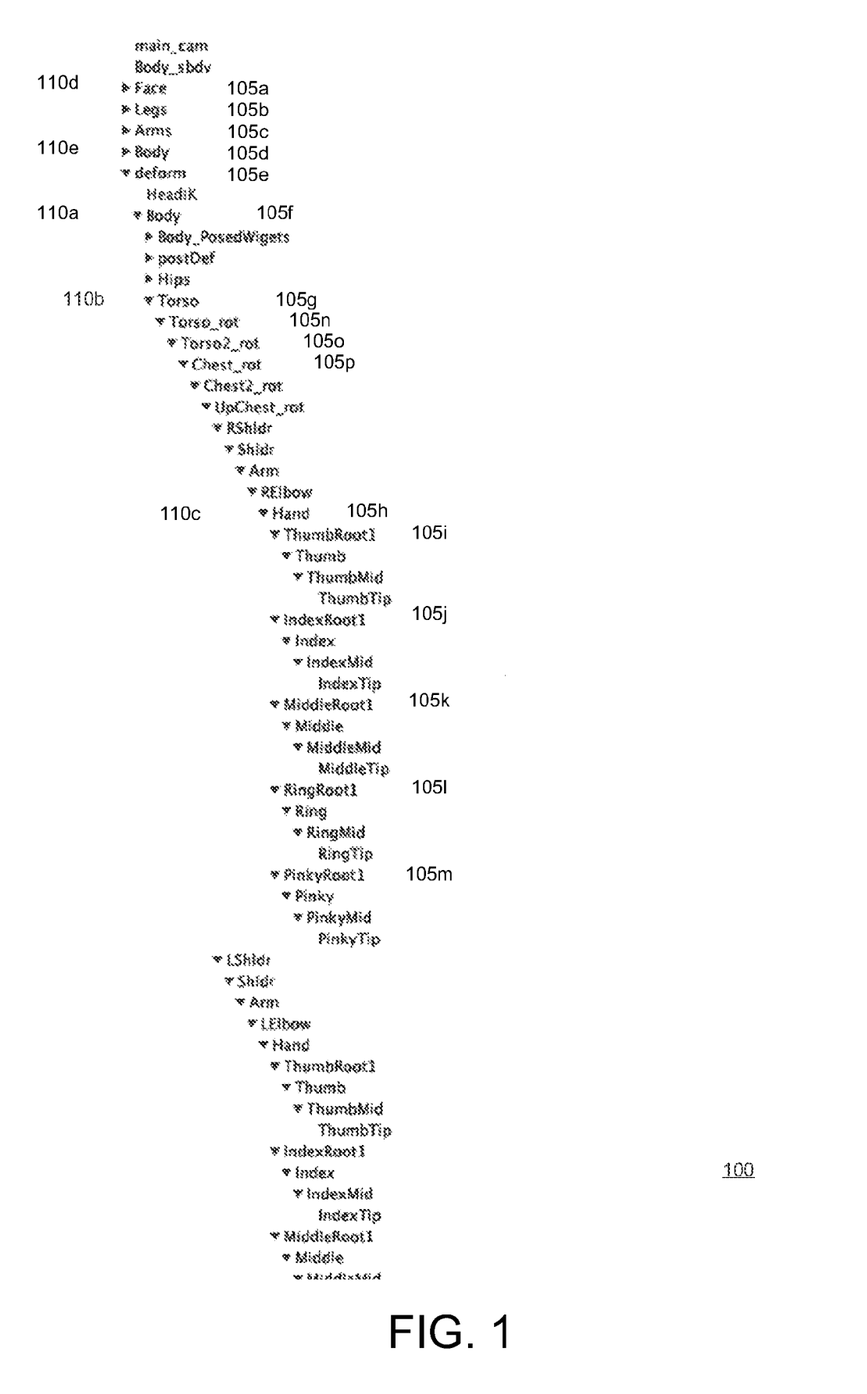
FIG. 1 illustrates an example display area presenting a hierarchy of items according to an embodiment of the invention.

FIG. 1 illustrates an example display area 100 presenting a hierarchy of items according to an embodiment of the invention. Display area 100 presents a list of items 105, with each item displayed on a separate line. Display area 100 may correspond with an application, operating system or web browser window; a full-screen display; or any other portion of a graphical user interface. Items 105a-105p may represent any type of data in a computer system, including files and directories in a file system; classes and subclasses of an object-oriented data model; data objects and attributes; data or metadata within a database or file; structured lists and outlines of data; blocks of text; source code; network hierarchies; data flows and networks of computations and operations, such as animation variables, shading networks, and deformer networks; hierarchical calendars and project timelines. The items may be selected by a user, an application, or provided in response to a search query or filter criteria. For example, display area 100 presents items representing components of a character model used for creating computer graphics images and animations, although embodiments of the invention may be applied to any other type of data in a computer system.

Display area 100 may display items 105a-105p as text, icons, still or moving images, previews or representations of item content, and/or any combination thereof. Although omitted for clarity, each line of the display area may be divided into multiple columns to present different attributes of each item.

Items 105a-105p may be related to other items by ancestor-descendant, container, or other relationships. Display area 100 presents a hierarchical view of the relationships between items. Although display area 100 presents a hierarchical view of item relationships, the items themselves are not necessarily arranged according to a strict hierarchy. For example, items may be related in a directed acyclic graph. In this example, an item may be displayed at two or more locations within a hierarchical view of item relationships.

In an embodiment, display area 100 displays children items below and indented from their respective parent items. For example, items 105a, 105b, 105c, 105d, and 105e are at the root level of a hierarchy and have no indentation. Item 105f, an item labeled "Body," is the descendant of item 105e, labeled "deform." This is indicated by the indentation of item 105f relative to item 105e. Each item may (or may not) be the ancestor or container for one or more items and may (or may not) itself be a descendant or contained by another item.

Display area 100 may be static or interactive. For example, if an item includes one or more descendant items, the display area 100 may present an expansion button 110a-110e for the item. When a user activates an expansion button 110a-110e of an item, the descendant items of this item are displayed with indentation according to their location in the hierarchy. For example, expansion button 110a of item 105f has been activated in the display area 100, revealing the descendant items including item 105g, labeled "Torso." Similarly, an expansion button 110b of item 105g has been activated, revealing the descendant items of item 105g, including item 105h, labeled "Hand." Additionally, the expansion button 110c of item 105h has been activated, revealing descendant items of the "Hand" item 105h, including items 105i, 105j, 105k, 105l, and 105m, representing the fingers of the "Hand" item 105k. Conversely, expansion buttons 110d and 110e are in a deactivated state, which keeps their respective descendant items hidden in the display area 100.

Additionally, display area 100 may include other interactive behavior, depending upon the types of items and the type of application. For example, selecting an item may open a corresponding file or directory, reveal attributes of the corresponding component, or start a corresponding application. In another example, items 105a-105p may be moved, for example by dragging with a cursor, to change their location in the hierarchy. Items 105a-105p may also serve as drop targets for moving or copying data from other locations. One or more items 105a-105p may be selected for editing, modification, or to define data operations. In these examples, the items are referred to as including active user interface elements responsive to commands from users or applications.

As can be seen in FIG. 1, the example hierarchical list of items 105a-105p includes deep hierarchies, in which an item can have a large number of ancestor items. For example, there are ten hierarchy levels between "Hand" item 105h and its ancestor item "Torso" 105g. For many deep hierarchies, the full hierarchical context of an item relative to its ancestors may not be visible in the display area 100. Even in situations where the full hierarchical context of an item is visible in the display area 100, the presentation of ancestor items across multiple lines makes it difficult for users to easily discern one or more sets of ancestor items.

Figure 2:
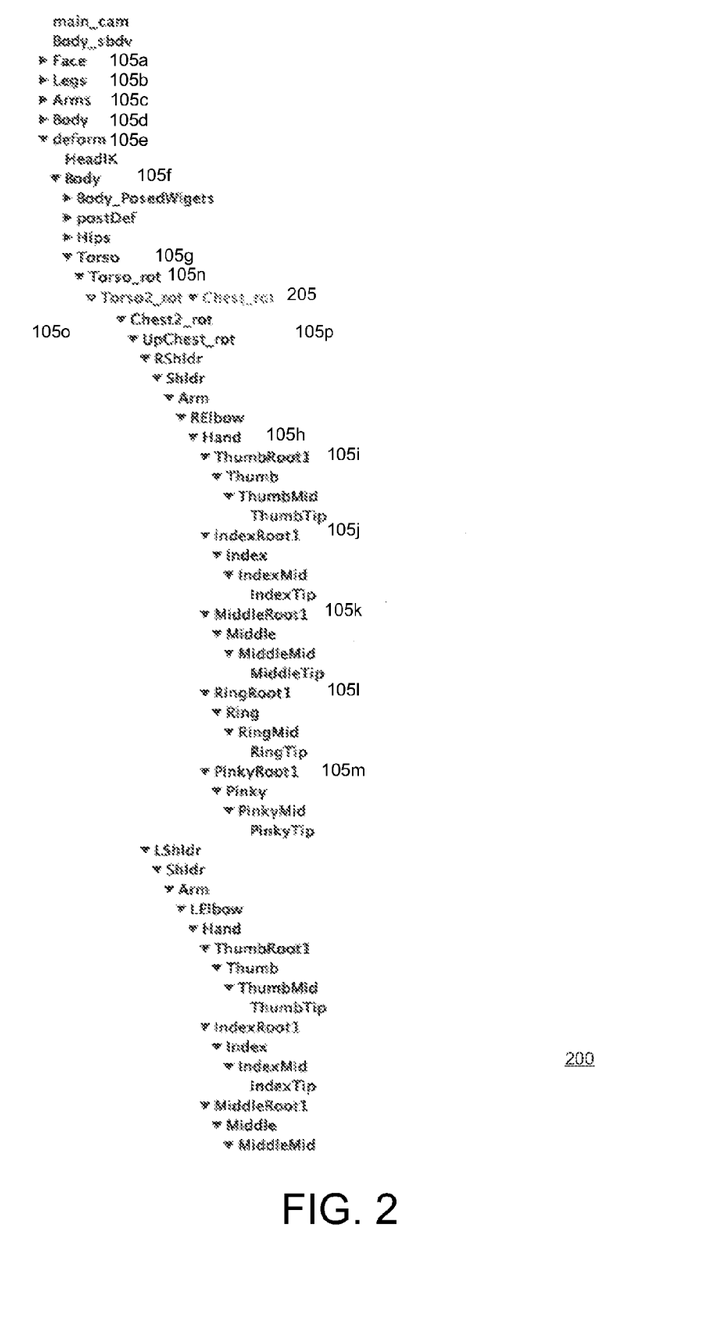
FIG. 2 illustrates an example display area presenting a condensed hierarchy level in a hierarchy of items according to an embodiment of the invention.

To address this, an embodiment of the invention allows users and applications to condense or combine two or more lines of a hierarchical list, representing two or more ancestor items, into a single combined line. FIG. 2 illustrates an example display area 200 presenting a condensed hierarchy level in a hierarchy of items according to an embodiment of the invention.

Display area 200 includes the set of items 105a-105p shown in FIG. 1. However, in this example, the lines presenting items 105o and 105p have been condensed into a single line 205 in the hierarchical list, rather than displayed on separate adjacent lines, as shown in display area 100 of FIG. 1. Line 205 is referred to as a condensed hierarchy line and is used to present lineally related items from multiple adjacent hierarchy levels to users. Lineally related items are items that are direct ancestors or descendants of each other. In this example, items 105o and 105p in line 205 are ancestors of items including items 105h, 105i, 105j, 105k, 105l, and 105m. Items 105o and 105p are also descendants of items including items 105n, 105f, and 105g.

An embodiment of the invention allows users or applications to select two or more items in adjacent hierarchy levels and to condense or combine these items into a single condensed hierarchy line. In a typical outline hierarchical view, each line displays a single item at a single hierarchy level. In an embodiment, a condensed hierarchy line displays two or more items in a single line, with each item having a different hierarchy level. Users may select and condense or combine lines of items using any type of input, including keyboard input, mouse input, touch screen or gesture input, voice input, and/or any combination thereof. Additionally, users may selectively separate two or more items previously combined in a condensed hierarchy line into separate lines, as shown in display area 100 of FIG. 1.

Figure 3:
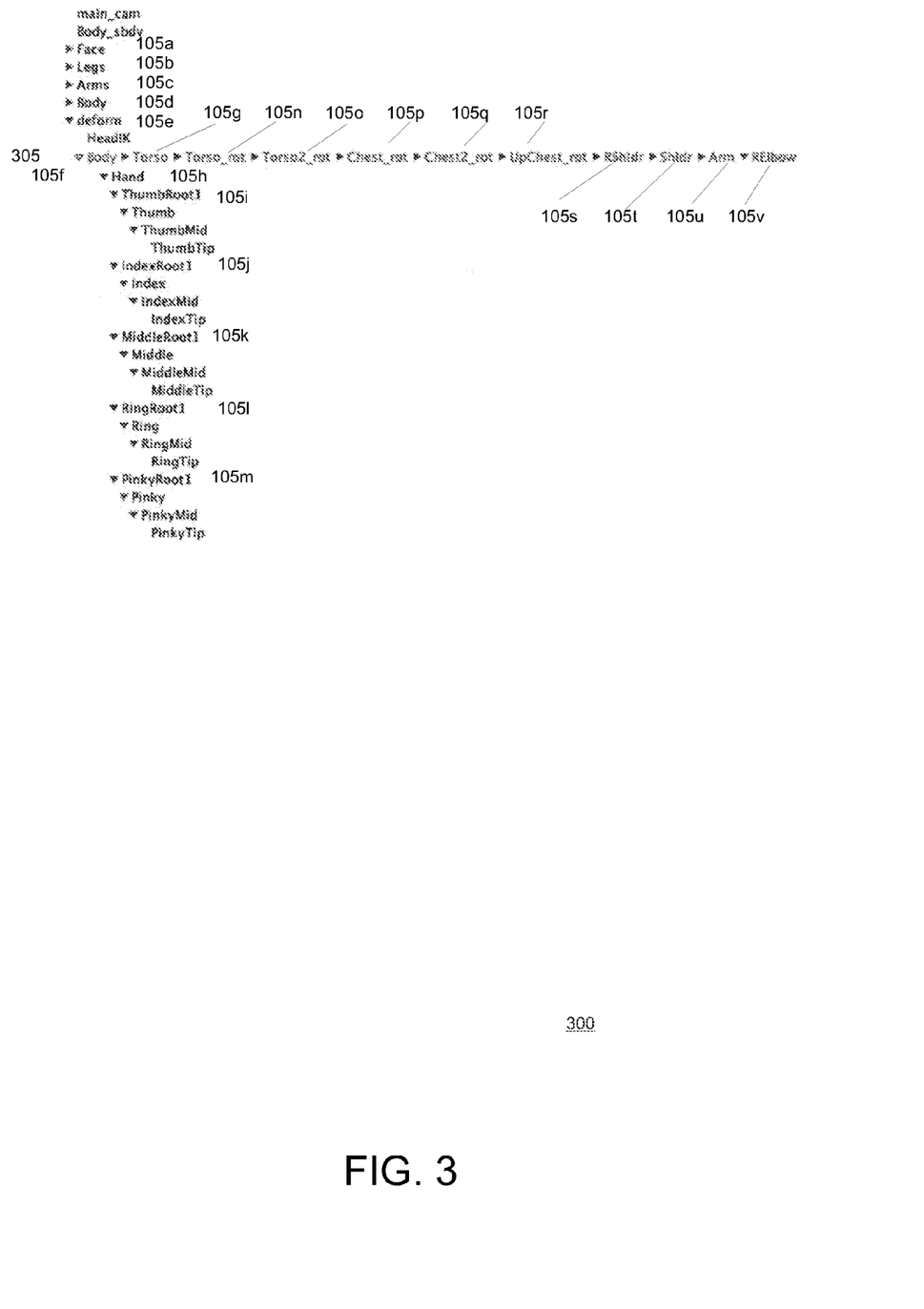
FIG. 3 illustrates an example display area presenting further condensed hierarchy levels in a hierarchy of items according to an embodiment of the invention.

By displaying items representing multiple levels of a hierarchy as a condensed hierarchy line, an embodiment of the invention makes it easy for users to view the hierarchical context of items. FIG. 3 illustrates an example display area 300 presenting further condensed hierarchy levels in a hierarchy of items according to an embodiment of the invention.

In this example, additional hierarchical levels of the set of items 105 have been condensed into a condensed hierarchy line 305. Condensed hierarchy line 305 includes items 105f, 105g, 105n, 105o, 105p, 105q, 105r, 105s, 105t, 105u, and 105v. Thus, condensed hierarchy line makes it easy for users to understand that the ancestor items of hand item 105h include items 105f, 105g, 105n, 105o, 105p, 105q, 105r, 105s, 105t, 105u, and 105v. Furthermore, because all of these ancestor items are presented in a single line by condensed hierarchy line 305, it is easy for user to view and manipulate the descendant items or other items in the display area 300 without excessive scrolling.

In an embodiment, if the set of items in line condensed hierarchy line 305 becomes wider than the width of the display area 300, an embodiment of the invention allows the set of items in a line to wrap to one or more additional lines. These additional lines may be indented to show their relationship with the original condensed line. In this embodiment, the wrapped lines may behave as a single line. In other embodiments, long sets of items condensed into a single line may be truncated or extended off-screen, with horizontal scrolling used to view the complete set of items in the condensed line.

In embodiment, active user interface elements associated with items in condensed hierarchy lines may have the same behavior or different behavior than corresponding elements outside of the condensed hierarchy line. In this embodiment, different portions of the condensed hierarchy line represent different items at different hierarchy levels. In an embodiment, each of the items in a condensed line may include its own expansion button, which can be used to reveal or hide descendant items. In a embodiment, as a user activates an expansion button of an item in the condensed hierarchy line, any descendant items associated with this ancestor item are automatically added to the condensed hierarchy line.

Figure 4:
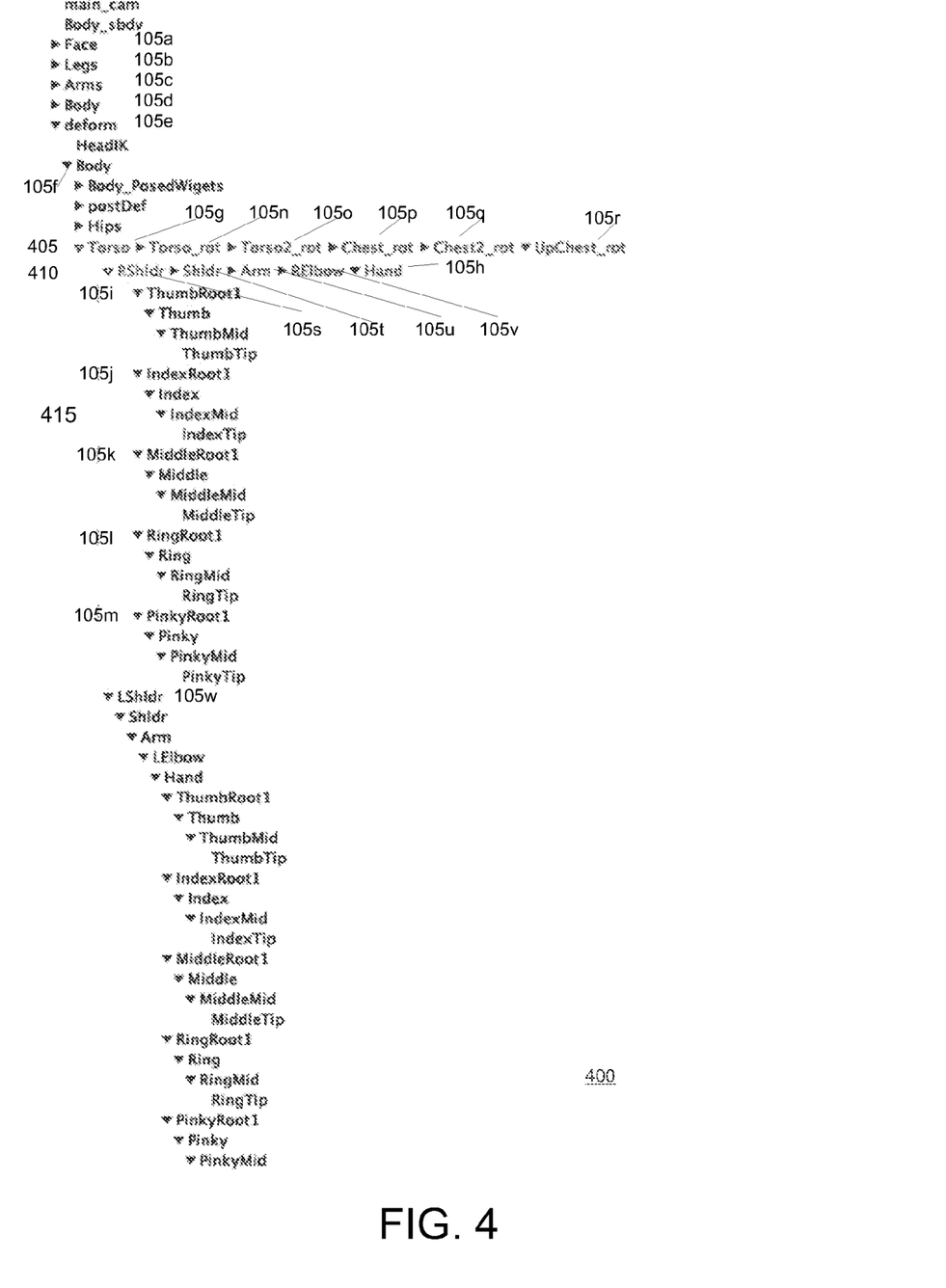
FIG. 4 illustrates an example display area presenting multiple sets of condensed hierarchy levels in a hierarchy of items according to an embodiment of the invention.

In an embodiment, users or applications may condense multiple lineally related sets of items into separate condensed hierarchy lines. FIG. 4 illustrates an example display area 400 presenting multiple sets of condensed hierarchy levels in a hierarchy of items according to an embodiment of the invention. Display area 400 includes condensed hierarchy lines 405 and 410. Condensed hierarchy line 405 includes items 105g, 105n, 105o, 105p, 105q, and 105r. Condensed hierarchy line 410 includes items 105s, 105t, 105u, 105v, and 105h. In this example, it is clear that the ancestors of items 105i, 105j, 105k, 105l, and 105m are shown in part by condensed hierarchy lines 410 and 405. Similarly, the ancestors of item 105w is shown in part by condensed hierarchy line 405.

In an embodiment, a visual indicator of a descendant relationship, such as indicator 415, shows that items 105i, 105j, 105k, 105l, and 105m are not immediate descendants of the first item 105g of condensed hierarchy line 405. Instead, items 105i, 105j, 105k, 105l, and 105m are immediate descendants of the last item 105r of condensed hierarchy line 405. Because indentation normally indicates immediate descent, a visual indicator, such as visual indicator 415, distinguishes the indentation of items from a condensed hierarchy line from the normal indentation indicating immediate descent. Visual indicators can include lines, color highlighting, and/or icons.

Figure 5:
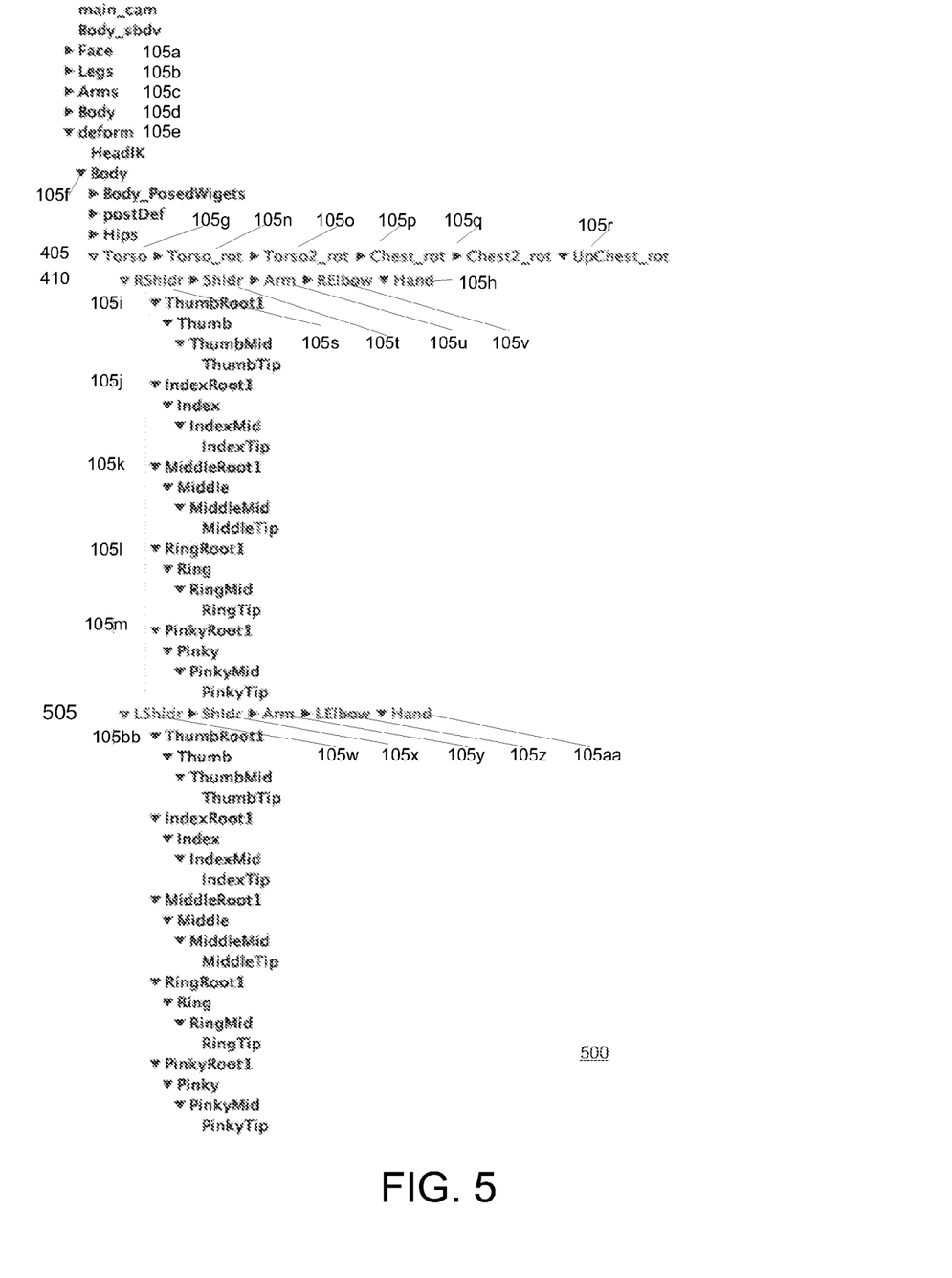
FIG. 5 illustrates an example display area presenting related sets of condensed hierarchy levels in a hierarchy of items according to an embodiment of the invention.

In an embodiment, users or applications may define multiple condensed hierarchy lines as needed from any arbitrary groups of items in adjacent hierarchy levels. Multiple condensed hierarchy lines may be used to show the context of multiple items in deep hierarchies in the same display area. Multiple condensed hierarchy lines can be used to show context for sibling relationships between items, such as items 105s and 105w. This use is further illustrated by FIG. 5. FIG. 5 illustrates an example display area 500 presenting related sets of condensed hierarchy levels in a hierarchy of items according to an embodiment of the invention.

Display area 500 includes condensed hierarchy lines 405, 410, and 505. As shown in FIG. 4, condensed hierarchy lines 405 and 410 include items 105g, 105n, 105o, 105p, 105q, and 105r; and items 105s, 105t, 105u, 105v, and 105h, respectively. Condensed 20 hierarchy line 505 includes items 105w, 105x, 105y, 105z, and 105aa. In this example display area 500, item 105bb has ancestor items 105w, 105x, 105y, 105z, and 105aa, shown in condensed hierarchy line 505. Similarly, item 105j has ancestor items 105s, 105t, 105u, 105v, and 105h, shown in condensed hierarchy line 410. Items 105bb and 105j share ancestor items 105g, 105n, 105o, 105p, 105q, and 105r, shown in condensed hierarchy line 405.

Figure 6:
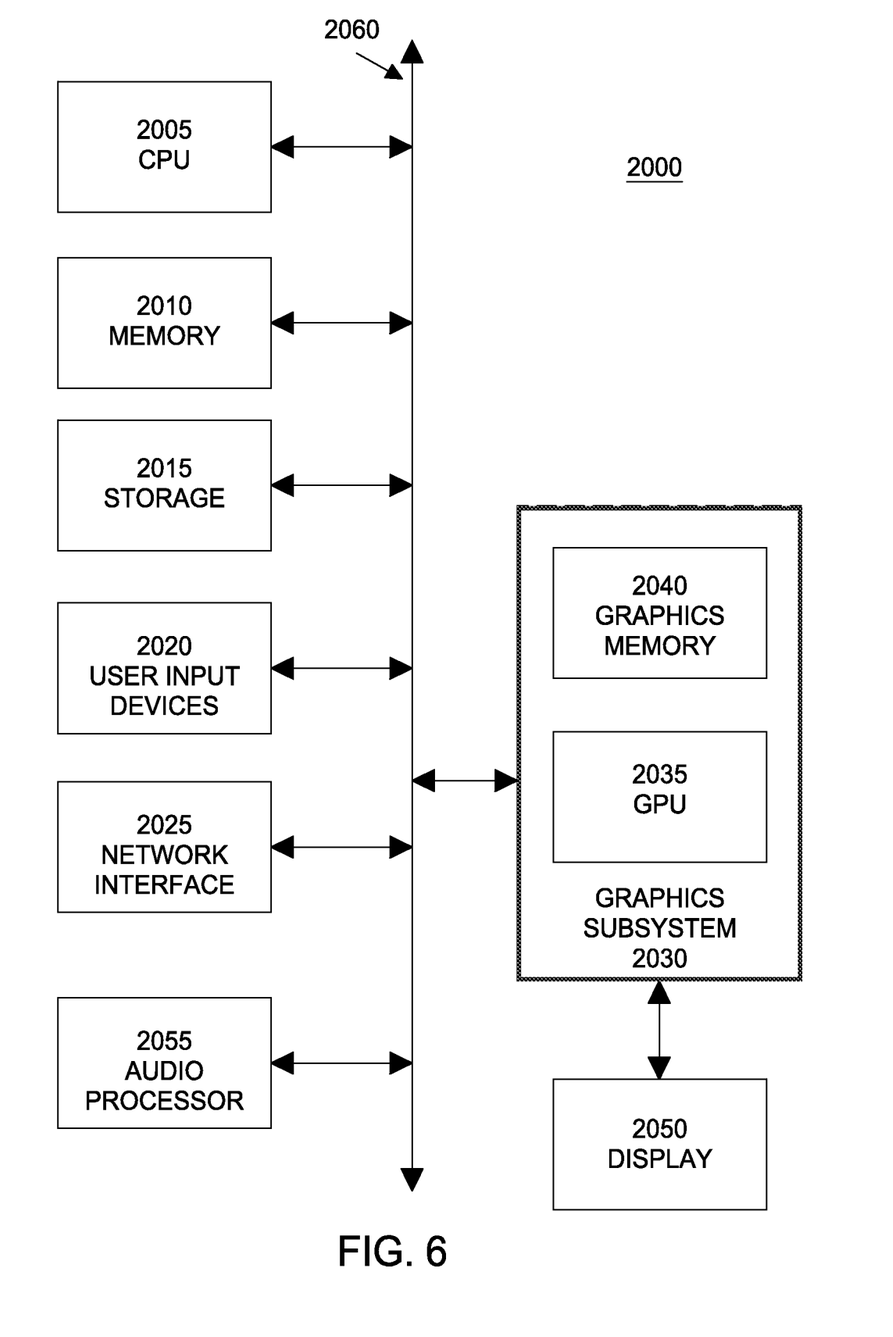
FIG. 6 illustrates an example computer system suitable for implementing embodiments of the invention.

FIG. 6 illustrates an example computer system 2000 suitable for implementing embodiments of the invention. FIG. 6 is a block diagram of a computer system 2000, such as a personal computer, video game console, personal digital assistant, other digital device, or other information processing device suitable for practicing an embodiment of the invention. Computer system 2000 includes a central processing unit (CPU) 2005 for running software applications and optionally an operating system. CPU 2005 may be comprised of one or more processing cores. Memory 2010 stores applications and data for use by the CPU 2005. Storage 2015 provides non-volatile storage for applications and data and may include fixed or removable hard disk drives, flash memory devices, and CD-ROM, DVD-ROM, Blu-ray, HD-DVD, or other magnetic, optical, or solid state storage devices.

User input devices 2020 communicate user inputs from one or more users to the computer system 2000, examples of which may include keyboards, mice, joysticks, digitizer lets, touch pads, touch screens, still or video cameras, motion sensors, and/or microphones. Network interface 2025 allows computer system 2000 to communicate with other computer systems via an electronic communications network, and may include wired or wireless communication over local area networks and wide area networks such as the Internet. An audio processor 2055 is adapted to generate analog or digital audio output from instructions and/or data provided by the CPU 2005, memory 2010, and/or storage 2015. The components of computer system 2000, including CPU 2005, memory 2010, data storage 2015, user input devices 2020, network interface 2025, and audio processor 2055 are connected via one or more data buses 2060.

A graphics subsystem 2030 is further connected with data bus 2060 and the components of the computer system 2000. The graphics subsystem 2030 includes at least one graphics processing unit (GPU) 2035 and graphics memory 2040. Graphics memory 2040 includes a display memory (e.g., a frame buffer) used for storing pixel data for each pixel of an output image. Graphics memory 2040 can be integrated in the same device as GPU 2035, connected as a separate device with GPU 2035, and/or implemented within memory 2010.

Pixel data can be provided to graphics memory 2040 directly from the CPU 2005. In some implementations, instructions and/or data representing a scene are provided to a renderfarm or a set of server computers, each similar to computer system 2000, via the network interface 2025 or storage 2015. The renderfarm generates one or more rendered images of the scene using the provided instructions and/or data. These rendered images may be stored on computer-readable media in a digital format and optionally returned to the computer system 2000 for display.

Alternatively, CPU 2005 provides the GPU 2035 with data and/or instructions defining the desired output images, from which the GPU 2035 generates the pixel data of one or more output images. The data and/or instructions defining the desired output images can be stored in memory 2010 and/or graphics memory 2040. In an embodiment, the GPU 2035 includes 3D rendering capabilities for generating pixel data for output images from instructions and data defining the geometry, lighting, shading, texturing, motion, and/or camera parameters for a scene. The GPU 2035 can further include one or more programmable execution units capable of executing shader programs. GPU 2035 can be comprised of one or more graphics processing unit cores.

The CPU 2005, renderfarm, and/or GPU 2035 can employ any surface or volume rendering technique known in the art to create one or more rendered images from the provided data and instructions, including rasterization, scanline rendering, REYES or micropolygon rendering, ray casting, ray tracing, image-based rendering techniques, and/or combinations of these and any other rendering or image processing techniques known in the art.

The graphics subsystem 2030 periodically outputs pixel data for an image from graphics memory 2040 to be displayed on display device 2050. Display device 2050 is any device capable of displaying visual information in response to a signal from the computer system 2000, including CRT, LCD, plasma, OLED, and SED displays, as well as film recorders adapted to reproduce computer generated images on photographic film. Computer system 2000 can provide the display device 2050 with an analog or digital signal.

In embodiments of the invention, CPU 2005 is one or more general-purpose microprocessors having one or more homogenous or heterogeneous processing cores. In further embodiments, all or a portion of the graphics subsystem 2030 or GPU 2035 is integrated into CPU 2005. In still further embodiments, all or a portion of the graphics subsystem 2030 may be omitted and software executed by CPU 2005 may perform the functions of the graphics subsystem 2030.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of displaying items associated with a hierarchy, the method comprising:
    displaying a first item associated with a first hierarchy level within a display area on a first line corresponding with the first hierarchy level;
    displaying a second item associated with a second hierarchy level within the display area on a second line corresponding with the second hierarchy level, wherein the second item is a descendant of the first item;
    receiving a first command selecting the first item and the second item; and
    in response to receiving the first command, displaying the first item in a first portion of a first condensed hierarchy line and the second item in a second portion of the first condensed hierarchy line, wherein the first condensed hierarchy line includes at least two additional items related to the first and second hierarchy levels, wherein the at least two additional items includes at least one descendant item of the first and second items, wherein a visual indicator is used to indicate that a first descendant item, of the at least one descendant item of the first and second items, is an immediate descendant of the second item and not an immediate descendant of the first item.

2. The method of claim 1, wherein the first portion of the first condensed hierarchy line represents the first hierarchy level and the second portion of the first condensed hierarchy line represents the second hierarchy level, the method further comprising:
    receiving a second command selecting a third item associated with a third hierarchy level and a fourth item associated with a fourth hierarchy level, wherein the third item is displayed on a third line corresponding with the third hierarchy level, wherein the fourth item is displayed on a fourth line corresponding to the fourth hierarchy level, wherein the fourth item is an immediate descendant of the third item, wherein the third and fourth items are not immediate descendants of the second item; and
    responsive to the second command, displaying the third item in a first portion of a third condensed hierarchy line and the fourth item in a second portion of the third condensed hierarchy line, wherein the third condensed hierarchy line is different than the first and second condensed hierarchy lines.

3. The method of claim 1, wherein the first condensed hierarchy line includes at least one active user interface element, wherein the first condensed hierarchy line is displayed in a location of the display area corresponding to the location of the display area in which the first line is displayed.

4. The method of claim 3, wherein the active user interface element includes an expansion button for each item displayed in the first condensed hierarchy line to display descendants of each item displayed in the first condensed hierarchy line.

5. The method of claim 1, wherein the first hierarchy level is adjacent to the second hierarchy level and the first portion of the first condensed hierarchy line is adjacent to the second portion of the first condensed hierarchy line.

6. The method of claim 1, wherein at least one additional hierarchy level is between the first hierarchy level and the second hierarchy level and at least one additional portion of the first condensed hierarchy line corresponding with the additional hierarchy level is between the first portion of the first condensed hierarchy line and the second portion of the first condensed hierarchy line.

7. The method of claim 1, wherein displaying the first item in the first portion of the first condensed hierarchy line and the second item in the second portion of first condensed hierarchy line comprises:
    removing the first item and the second item from the display area; and
    creating the first condensed hierarchy line including the first and second portions; and
    adding the first condensed hierarchy line to the display area.

8. The method of claim 1, wherein displaying the first item with the first portion of the first condensed hierarchy line and the second item with the second portion of first condensed hierarchy line comprises:
    removing the first item and the second item from the display area; and
    adding the first portion and the second portion to the first condensed hierarchy line previously displayed in the display area and including the at least two additional items related to the first and second hierarchy levels.

9. The method of claim 1, wherein the at least two additional items includes at least one ancestor item of the first and second items.

10. The method of claim 1, further comprising:
    receiving a second command selecting at least the first and second portions of the condensed hierarchy line; and
    in response to the second command, removing at least the first item and the second item from the condensed hierarchy line and displaying the first item on the first line and the second item on the second line in the display area.

11. The method of claim 1, wherein the first command is received from a user via an input device.

12. The method of claim 1, wherein the first command is received from an application.

13. The method of claim 1, wherein the items are individually selected from each item comprising:
    data in a computer system; files and directories in a file system; classes and subclasses of an object-oriented data model; data objects and attributes; data or metadata within a database or file; structured lists and outlines of data; blocks of text; source code; network hierarchies; computer graphics components; data flows and networks of computations and operations, such as animation variables, shading networks, and deformer networks; and hierarchical calendars and project timelines.

14. The method of claim 1, wherein the items are received in response to a search query.

15. A non-transitory computer-readable storage medium having computer-readable program code embodied therewith, the computer-readable program code comprising:

computer-readable program code configured to display a first item associated with a first hierarchy level within a display area on a first line corresponding with the first hierarchy level;

computer-readable program code configured to display a second item associated with a second hierarchy level, wherein the second hierarchy level is a descendant of the first hierarchy level;

computer-readable program code configured to receive a first command selecting the first item and the second item; and computer-readable program code configured to display the first item in a first portion of a first condensed hierarchy line and the second item in a second portion of the first condensed hierarchy line, wherein the first condensed hierarchy line includes at least two additional items related to the first and second hierarchy levels, wherein the at least two additional items includes at least one descendant item of the first and second items, wherein a visual indicator is used to indicate that a first descendant item, of the at least one descendant item of the first and second items, is an immediate descendant of the second item and not an immediate descendant of the first item.

16. The non-transitory computer-readable storage medium of claim 15, wherein the first portion of the first condensed hierarchy line represents the first hierarchy level and the second portion of the first condensed hierarchy line represents the hierarchy level, the computer-readable program code further comprising:

computer-readable program code configured to receive a second command selecting a third item associated with a third hierarchy level and a fourth item associated with a fourth hierarchy level, wherein the third item is displayed on a third line corresponding with the third hierarchy level, wherein the fourth item is displayed on a fourth line corresponding to the fourth hierarchy level, wherein the fourth item is an immediate descendant of the third item, wherein the third and fourth items are not immediate descendants of the second item; and computer-readable program code configured to, responsive to the second command, display the third item in a first portion of a third condensed hierarchy line and the fourth item in a second portion of the third condensed hierarchy line, wherein the third condensed hierarchy line is different than the first and second condensed hierarchy lines.

17. The non-transitory computer-readable storage medium of claim 15, wherein displaying the first item with the first portion of the first condensed hierarchy line and the second item with the second portion of first condensed hierarchy line comprises:

removing the first item and the second item from the display area; and adding the first portion and the second portion to the first condensed hierarchy line previously displayed in the display area and including the least two additional items.

18. The non-transitory computer-readable storage medium of claim 15, wherein the first condensed hierarchy line includes at least one active user interface element.

19. The non-transitory computer-readable storage medium of claim 18, wherein the active user interface element includes an expansion button for each item displayed in the first condensed hierarchy line adapted to display descendants of each item displayed in the first condensed hierarchy line.

20. The non-transitory computer-readable storage medium of claim 15, wherein the first hierarchy level is adjacent to the second hierarchy level and the first portion of the first condensed hierarchy line is adjacent to the second portion of the first condensed hierarchy line.

21. The non-transitory computer-readable storage medium of claim 15, wherein at least one additional hierarchy level is between the first hierarchy level and the second hierarchy level and at least one additional portion of the first condensed hierarchy line corresponding with the additional hierarchy level is between the first portion of the first condensed hierarchy line and the second portion of the first condensed hierarchy line.

22. The non-transitory computer-readable storage medium of claim 15, wherein the items are individually selected from each item comprising:

data in a computer system; files and directories in a file system; classes and subclasses of an object-oriented data model; data objects and attributes; data or metadata within a database or file; structured lists and outlines of data; blocks of text; source code; network hierarchies; computer graphics components; data flows and networks of computations and operations, such as animation variables, shading networks, and deformer networks; and hierarchical calendars and project timelines.

23. The non-transitory computer-readable storage medium of claim 15, wherein the items are received in response to a search query.

24. A non-transitory computer-readable storage medium having computer-readable program code embodied therewith, the computer-readable program code comprising:

computer-readable program code configured to display a first item associated with a first hierarchy level within a display area on a first line corresponding with the first hierarchy level;

computer-readable program code configured to display a second item associated with a second hierarchy level, wherein the second hierarchy level is a descendant of the first hierarchy level;

computer-readable program code configured to receive a first command selecting the first item and the second item;

computer-readable program code configured to display the first item in a first portion of a first condensed hierarchy line and the second item in a second portion of the first condensed hierarchy line;

computer-readable program code configured to receive a second command selecting a third item associated with a third hierarchy level and a fourth item associated with a fourth hierarchy level, wherein the third item is displayed on a third line corresponding with the third hierarchy level, wherein the fourth item is displayed on a fourth line corresponding to the fourth hierarchy level, wherein the fourth item is a descendant of the third item, wherein the third and fourth items are not descendants of the second item; and computer-readable program code configured to, responsive to the second command, display the third item in a first portion of a third condensed hierarchy line and the fourth item in a second portion of the third condensed hierarchy line.

* * * * *